US010210008B2

(12) United States Patent
Shimonishi et al.

(10) Patent No.: US 10,210,008 B2
(45) Date of Patent: Feb. 19, 2019

(54) CONTROL SERVER, SERVICE PROVIDING SYSTEM, AND METHOD OF PROVIDING A VIRTUAL INFRASTRUCTURE

(75) Inventors: Hideyuki Shimonishi, Tokyo (JP); Takayuki Hama, Tokyo (JP); Takeharu Yasuda, Tokyo (JP); Yuki Tanaka, Tokyo (JP); Shuji Ishii, Tokyo (JP); Masanori Takashima, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 114 days.

(21) Appl. No.: 13/388,039

(22) PCT Filed: Jul. 30, 2010

(86) PCT No.: PCT/JP2010/062910
§ 371 (c)(1),
(2), (4) Date: Feb. 29, 2012

(87) PCT Pub. No.: WO2011/013805
PCT Pub. Date: Feb. 3, 2011

(65) Prior Publication Data
US 2012/0158938 A1 Jun. 21, 2012

(30) Foreign Application Priority Data

Jul. 31, 2009 (JP) ................................. 2009-180023
Feb. 24, 2010 (JP) ................................. 2010-038974

(51) Int. Cl.
*G06F 9/455* (2018.01)
*H04L 12/24* (2006.01)

(52) U.S. Cl.
CPC ...... *G06F 9/45558* (2013.01); *H04L 41/0233* (2013.01); *H04L 41/0803* (2013.01);
(Continued)

(58) Field of Classification Search
CPC . G06F 2009/45579; G06F 2009/45595; G06F 9/45558
(Continued)

(56) References Cited

U.S. PATENT DOCUMENTS 7,093,035 B2    8/2006  Hashimoto
7,430,568 B1*   9/2008  DeKoning .......... G06F 11/0727
(Continued)

FOREIGN PATENT DOCUMENTS

CN    1642169 A    7/2005
CN    1652084 A    8/2005
(Continued)

OTHER PUBLICATIONS

International Search Report in PCT/JP2010/062910 dated Nov. 2, 2010 (English Translation thereof).
(Continued)

*Primary Examiner* — Thomas J Dailey
(74) *Attorney, Agent, or Firm* — Sughrue Mion, PLLC

(57) ABSTRACT

A service providing system includes a control server and a physical resource(s) controlled by the control server. The control server has a virtual device providing unit(s) that provides at least one virtual object for controlling a physical resource(s), and a virtual infrastructure providing unit(s) that can provide, as a virtual object(s), a virtual infrastructure(s) configured using at least one virtual object provided by the virtual device providing unit(s), wherein the virtual infrastructure providing unit(s) can configure a virtual infrastructure(s) using the virtual object(s) provided by the virtual infrastructure providing unit(s), and can provide the virtual infrastructure(s) as a virtual object(s).

27 Claims, 12 Drawing Sheets

(52) U.S. Cl.
CPC .............. *G06F 2009/45579* (2013.01); *G06F 2009/45595* (2013.01)

(58) Field of Classification Search
USPC ........................................................ 709/223
See application file for complete search history.

(56) References Cited

U.S. PATENT DOCUMENTS

| | | | |
|---|---|---|---|
| 7,519,745 | B2 | 4/2009 | Hashimoto |
| 7,954,099 | B2 | 5/2011 | Easton |
| 8,176,211 | B2 | 5/2012 | Hashimoto |
| 8,327,353 | B2 | 12/2012 | Traut |
| 8,478,801 | B2* | 7/2013 | Hutchins ........... G06F 17/30115 707/803 |
| 8,495,254 | B2 | 7/2013 | Hashimoto |
| 2005/0005089 | A1* | 1/2005 | Eckhart ................. G06F 9/4812 712/244 |
| 2005/0262264 | A1 | 11/2005 | Ando et al. |
| 2006/0005003 | A1* | 1/2006 | Grobman ............. G06F 9/4812 713/2 |
| 2006/0034302 | A1* | 2/2006 | Peterson ................. H04L 45/04 370/401 |
| 2007/0050764 | A1 | 3/2007 | Traut |
| 2007/0094367 | A1* | 4/2007 | Esfahany ............. G06F 9/5077 709/223 |
| 2008/0242418 | A1* | 10/2008 | Theimer ................. H04W 4/02 463/42 |
| 2009/0031222 | A1 | 1/2009 | Nakamura et al. |
| 2009/0254842 | A1* | 10/2009 | Leacock ............. H04L 12/1827 715/757 |
| 2009/0327471 | A1* | 12/2009 | Astete ................ G06F 9/45533 709/223 |
| 2009/0328058 | A1* | 12/2009 | Papaefstathiou ....... G06F 9/485 718/107 |
| 2010/0070319 | A1* | 3/2010 | Prafullchandra ...... G06Q 10/06 726/22 |
| 2010/0138830 | A1* | 6/2010 | Astete ................ G06F 9/45533 718/1 |
| 2010/0169948 | A1* | 7/2010 | Budko .................... G06F 21/53 726/1 |
| 2010/0257450 | A1* | 10/2010 | Go ........................ G06F 3/0481 715/733 |
| 2010/0325588 | A1* | 12/2010 | Reddy .................... G06F 3/048 715/853 |
| 2011/0035802 | A1* | 2/2011 | Arajujo, Jr. ........... G06F 11/079 726/23 |

FOREIGN PATENT DOCUMENTS

| | | |
|---|---|---|
| CN | 101075198 A | 11/2007 |
| CN | 101253481 A | 8/2008 |
| JP | 2005-340937 A | 12/2005 |
| JP | 2009-506462 A | 2/2009 |
| WO | 2007/047858 A1 | 4/2007 |
| WO | WO 2007/108061 A1 | 9/2007 |
| WO | WO 2007/109685 A2 | 9/2007 |

OTHER PUBLICATIONS

Nick McKeown and 7 others, "OpenFlow: Enabling Innovation in Campus Networks", [online], [Searched on Jul. 17, 2009] Internet <URL: http://www.openflowswitch.org//documents/openflow-wp-latest.pdf>.
Yuichi Ohshita, et al., "Design of Dynamic topology control server for optimization of resource allocation in virtualized network" IEICE Technical Report, Mar. 2, 2009, vol. 108, No. 476,pp. 93-98.
Extended European Search Report dated Jan. 10, 2013.
Sherwood, et al., "Carving Research Slices Out of Your Production Networks with OpenFlow", SIGCOMM 2009 Conference, Aug. 17, 2009 (Aug. 17, 2009), Aug. 21, 2009 (Aug. 21, 2009), pp. 1-2, XP002689234.
Mosharaf, et al., "A Survey of Network Virtualization", Internet Article, Oct. 15, 2005 (Oct. 15, 2005), pp. 1-29, XP002689235.
Search Report and Chinese Office Action dated Jan. 28, 2014, with partial Japanese and English translation.
IT Architect Summit 2009 Report, IT Architect, Japan, IDG Japan co., ltd, May 14, 2009, vol. 22, p. 18.
Japanese office Action dated Jan. 6, 2015 with an English Translation thereof.
Japanese Office Action dated Oct. 6, 2015 with a partial English translation.
Yu Enokibori and Nobuhiko Nishio, "A Virtualization of Smart Environment for Flexible Structure Reconfiguration", Human-centered Universal/Ubiquitous Network Service, Transactions of Information Processing Society Incorporated Association, Jan. 2008, vol. 49, No. 1, p. 58-68 (English Abstract).
Communication dated Jan. 16, 2018 from the European Patent Office in counterpart Application No. 10 804 551.9.
Anonymous, "Network virtualization", Wikipedia, retrieved on Aug. 8, 2018, XP055498277, Internet, URL ,https:en.wikipedia.org/w/index.php?title=Network_virtualization&oldid=305044541>, total 4 pages.
Communication dated Aug. 13, 2018 from the European Patent Office in counterpart Application No. 10 804 551.9.

* cited by examiner

CONTROL SERVER, SERVICE PROVIDING SYSTEM, AND METHOD OF PROVIDING A VIRTUAL INFRASTRUCTURE

TECHNICAL FIELD

Reference to Related Application

This application is based upon and claims the benefit of the priority of Japanese patent application No. 2009-180023, filed on Jul. 31, 2009, and Japanese Patent Application No. 2010-038974, filed on Feb. 24, 2010, the disclosure of which are incorporated herein in their entirety by reference thereto.

The present invention relates to a control server, a service providing system, and a method of providing a virtual infrastructure(s), and in particular to a control server, a service providing system, and a method of providing a virtual infrastructure(s), using virtual technology in which certain physical resource(s) is simulated as a plurality of logical resources.

BACKGROUND

There exists a method of hierarchically configuring and integrally managing and controlling an infrastructure such as a network or server.

As a method of hierarchically arranging and integrally managing and controlling a network, a multi-layer MPLS (Multi-Protocol Label Switching) network is disclosed in Patent Document 1, for example. Patent Document 1 discloses a configuration in which respective external servers are provided for the hierarchical MPLS network, and band confirmation and path determination are performed for each external server (refer to paragraphs 0135 to 0138, and FIG. 32 of Patent Document 1).

Furthermore, it is also known that within the same device in the same layer, a certain device is managed as a cluster of objects hierarchically configured by links, switches, and the like. For example. Patent Document 2 discloses a method of providing hierarchical visualization in a virtual machine environment. The same document discloses a configuration including a second partition generated by a virtualized stack in a first partition maintained using a hypervisor, and a hypervisor microkernel that communicates directly with the first and second partitions.
[Patent Document 1]
Japanese Patent Kokai Publication No. JP-P2005-340937A
[Patent Document 2]
Japanese Paten Kohyo Publication No. JP-P2009-506462A
[Non-Patent Document 1]
Nick McKeown, and 7 others, "OpenFlow: Enabling Innovation in Campus Networks", [online], [search conducted Jul. 17, 2009] Internet URL:http://www.openflowswitch.org//documents/openflow-wp-latest.pdf

SUMMARY

It is to be noted that the entire disclosed contents of the abovementioned patent documents and non-patent document are incorporated herein by reference thereto.

The following analysis is given from a viewpoint of the present invention. In a method of Patent Document 1 it is not possible to cut out only a required amount of virtualized resources and provide a virtualized infrastructure. In Patent Document 1, an object that is a target for operation on a control plane or a management plane has a 1-to-1 correspondence with a physical data plane device (for example, a router in Patent Document 1). As a result, there is a problem in that virtualization of each device and use thereof to configure a virtual infrastructure with a high degree of freedom is not possible.

Furthermore, in the method of Patent Document 1, it is not possible to build a virtual infrastructure different from layer configuration or physical device configuration. For example, in a case where the physical infrastructure is an infrastructure of layers configured by switches and routers, a virtual infrastructure built thereupon is constrained by the arrangement of the switches and routers.

Furthermore, Patent Document 2 relates to partitions to be used by partitioning physical resources of a computer, and stops at disclosing a configuration in which it is possible to set virtual stacks in parallel or hierarchically in a unique parent partition.

The present invention has been done in view of the abovementioned matter, and it is an object thereof to provide a control server, a service providing system, and a method of providing a virtual infrastructure, wherein the virtual infrastructure is hierarchically built, individual physical resources are integrally controlled in accordance with hierarchical relationships of the virtual infrastructure, and various functions can be provided.

According to a first aspect of the present invention, there is provided a control server comprising: a virtual device providing unit(s) that provides at least one virtual object for controlling a physical resource(s); and a virtual infrastructure providing unit(s) that can provide, as a virtual object(s), a virtual infrastructure(s) configured by using at least one virtual object provided by the virtual device providing unit(s); wherein the virtual infrastructure providing unit(s) can configure a virtual infrastructure(s) using a virtual object(s) provided by the virtual infrastructure providing unit(s), and can provide the virtual infrastructure(s) as a virtual object(s).

According to a second aspect of the present invention, there is provided a service providing system including the abovementioned control server and a physical resource(s) controlled by the control server.

According to a third aspect of the present invention, there is provided a method of creating a virtual infrastructure(s) by building a virtual infrastructure(s) by using a control server comprising a virtual device providing unit(s) that provides at least one virtual object for controlling a physical resource(s), and a virtual infrastructure providing unit(s) that can provide, as a virtual object(s), a virtual infrastructure(s) configured by using at least one virtual object provided by the virtual device providing unit(s), wherein the virtual infrastructure providing unit(s) of the control server configures a virtual infrastructure(s) using a virtual object(s) provided by the virtual infrastructure providing unit(s), and provides the virtual infrastructure(s) as a virtual object(s). The present method is linked with a specific apparatus, known as a control server (computer), having a plurality of the virtual device providing units and the virtual infrastructure providing units, respectively.

According to a fourth aspect of the present invention, there is provided a program that executes on a control server comprising a virtual device providing unit(s) that provides at least one virtual object for controlling a physical resource(s), and a virtual infrastructure providing unit(s) that can provide, as a virtual object(s), a virtual infrastructure(s) configured by using at least one virtual object provided by the virtual device providing unit(s); wherein the program controls the virtual infrastructure providing unit(s) so that the virtual infrastructure providing unit(s) configures a virtual infrastructure(s) using a virtual object(s) provided by the virtual infrastructure providing unit(s), and provides the virtual infrastructure(s) as a virtual object(s). It is to be noted that this program can be recorded on a storage medium that is computer readable. That is, the present invention can be embodied as a computer program product.

According to the present invention, it is possible to virtualize a plurality of physical resources, hierarchically build a plurality of virtual infrastructures using these virtualized resources, integrally control these virtual infrastructures, and realize various functions and services.

PREFERRED MODES

Figure 1:
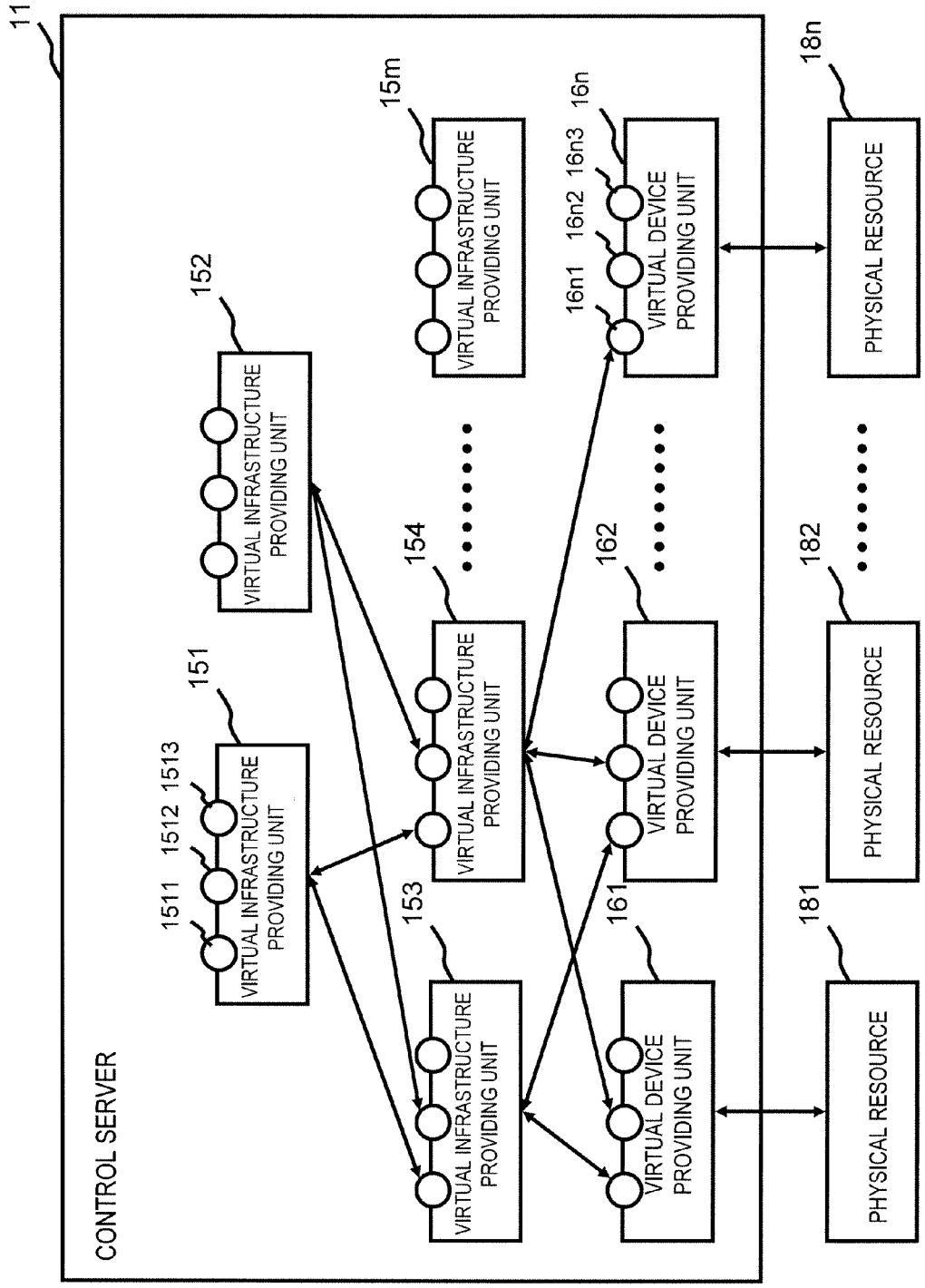
FIG. 1 is a diagram for describing an outline of the present invention.

First, a description is given of an outline of the present invention, making reference to FIG. 1. As shown in FIG. 1, a service providing system of the present invention is configured by including n physical resources 181 to 18n, and a control server 11 that is connected via a control channel and performs control and monitoring of then physical resources 181 to 18n. It is to be noted that drawing reference symbols noted in this outline are added for convenience to respective elements as an example in order to aid understanding, and are not intended to limit the invention to illustrated modes of the drawings.

The control server 11 has a plurality of each of: a virtual device providing unit (for example, a virtual device providing unit 16n) that provides three virtual objects 16n1 to 16n3 for controlling a specified physical resource (for example, a physical resource 18n), and a virtual infrastructure providing unit (for example, a virtual infrastructure providing unit 154 built using the virtual object 16n1) that provides, as a virtual object, a virtual infrastructure configured using at least one virtual object including a virtual object provided by the virtual device providing unit (for example, the virtual device providing unit 16n). Here, assume that there are m virtual infrastructure providing units, and there are n virtual device providing units.

One virtual infrastructure providing unit (for example, the virtual infrastructure providing unit 151) among the m virtual infrastructure providing units 151 to 15m can provide a virtual infrastructure configured using at least one virtual object including a virtual object provided by any one of the virtual infrastructure providing units (for example, the virtual infrastructure providing unit 153) among the m virtual infrastructure providing units.

Here, as shown in FIG. 1, the virtual infrastructure providing unit 151 uses a virtual object provided by the virtual infrastructure providing unit 153 and a virtual object provided by the virtual infrastructure providing unit 154. Furthermore, assume that the virtual infrastructure providing units 153 and 154 each use a virtual object provided by the virtual device providing unit 161 and a virtual object provided by the virtual device providing unit 162.

At this time, when, for example, some kind of control information is given to the virtual infrastructure providing unit 151, having performed processing in accordance with the control information, the virtual infrastructure providing unit 151 outputs additional control information to a virtual object being used, as necessary. The virtual infrastructure providing units 153 and 154, which receive the output of the control information, distinguish, among virtual objects that they themselves have provided, to which virtual object the respective control information has been given, and having performed processing in accordance with the control information in question, output additional control information to the virtual object they themselves are using, as necessary. The virtual device providing units 161 and 162, which receive the output of the control information, distinguish, among virtual objects that they themselves have provided, to which virtual object the respective control information has been given, and having performed processing in accordance with the control information in question, output additional control information to physical resources 181 and 182 respectively associated thereto, as necessary.

On the other hand, in a case where there is a response or an automatic report with regard to the control information, from the physical resources 181 and 182 to the virtual device providing units 161 and 162, processing according to the information in question is performed in each of the virtual device providing units 161 and 162 and the virtual infrastructure providing units 153 and 154, and finally transmissions are made to the virtual infrastructure providing unit 151.

The abovementioned virtual device providing units can be added, deleted, and modified as appropriate in accordance with change/difference in the physical resources, and the abovementioned virtual infrastructure providing units can be added, modified, or deleted in an embodiment using an existing virtual object(s). According to the above, it is possible to have a plurality of various data plane devices and to build various types of virtual infrastructure(s), and perform integral control and realize various functions and services.

The control server of the present invention can also be specified as follows. That is, the control server of the present invention has a virtual device providing unit(s) that provides at least one virtual object for controlling a physical resource(s), and a plurality of virtual infrastructure providing units that provide, as a virtual object(s), a virtual infrastructure(s) configured using at least one virtual object, wherein one virtual infrastructure providing unit among the plurality of virtual infrastructure providing units provides a virtual infrastructure configured using at least one virtual object including a virtual object provided by any one virtual infrastructure providing unit among the plurality of virtual infrastructure providing units.

First Exemplary Embodiment

Figure 2:
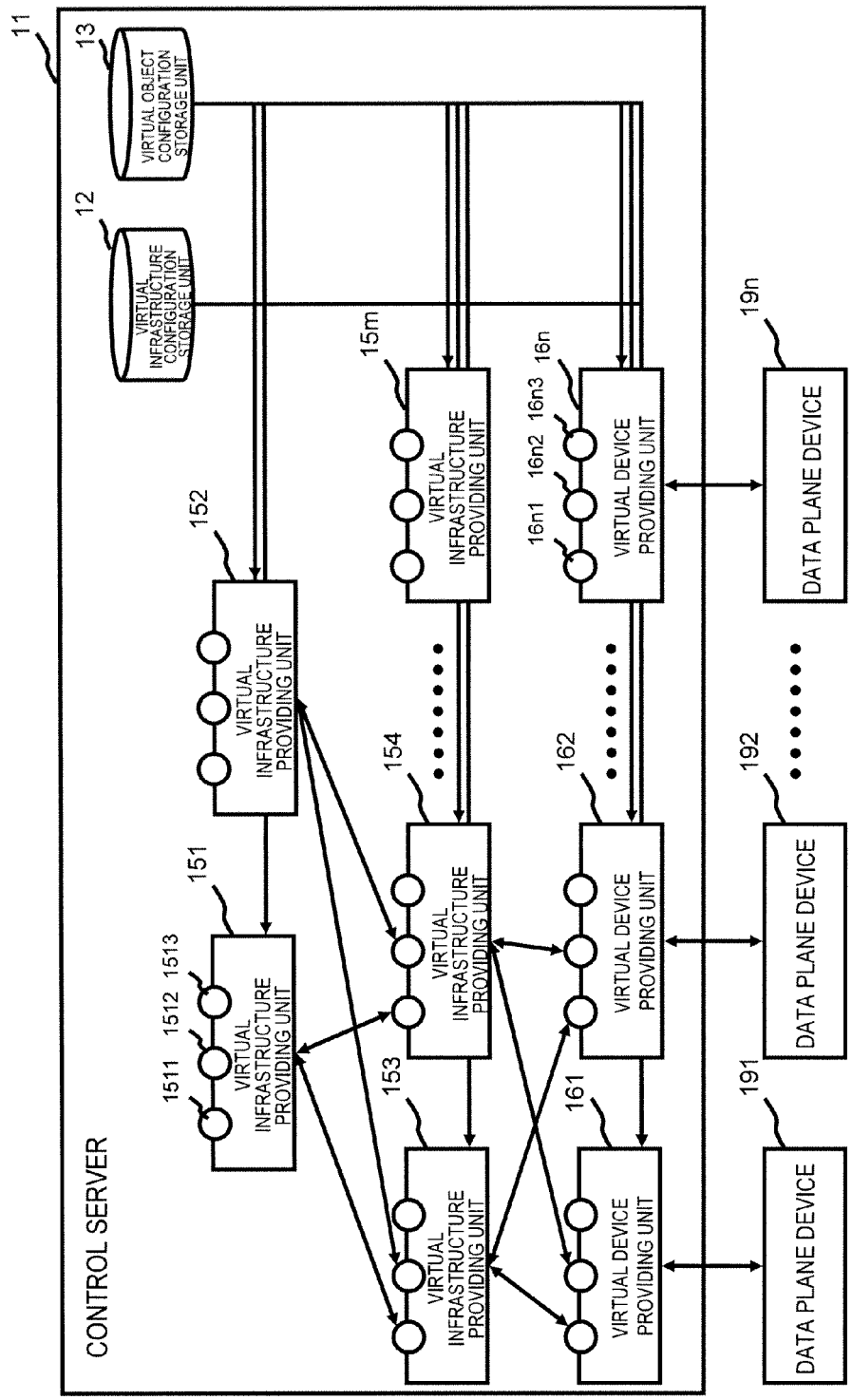
FIG. 2 is a block diagram representing a configuration of a first exemplary embodiment of the present invention.

Next, a detailed description is given concerning a first exemplary embodiment of the present invention, making reference to the drawings. FIG. 2 is a block diagram representing a configuration of a service providing system according to the first exemplary embodiment of the present invention. Referring to FIG. 2, a control server 11 and n data plane devices 191 to 19n are shown.

The data plane devices 191 to 19n are connected to the control server 11 via n control channels respectively corresponding to each thereof. With regard to the data plane devices 191 to 19n, an OpenFlow switch of Non-Patent Document 1, various types of router, optical nodes, various types of base station device, and the like may be cited.

The control server 11 is provided with virtual device providing units 161 to 16n that control the data plane devices 191 to 19n, m virtual infrastructure providing units 151 to 15m that function as virtual infrastructures by virtual objects being assigned, a virtual infrastructure configuration storage unit 12 that stores each virtual object assignment with respect to the virtual infrastructure providing units, and a virtual object configuration storage unit 13 that stores virtual object configuration information and information on sources thereof, i.e., virtual device providing units or virtual infrastructure providing units.

The virtual device providing units 161 to 16n generate at least one virtual object obtained by virtualizing data plane devices to which they are respectively connected, and provide the at least one virtual object to the virtual infrastructure providing units 151 to 15m. For example, the virtual device providing unit 16n of FIG. 2 provides 3 virtual objects 16n1 to 16n3, obtained by virtualizing the connected data plane device 19n. It is to be noted that the number of virtual objects provided by the respective virtual device providing units is not limited to 3, and can be set as appropriate in accordance with type, performance, or the like, of the data plane device 19n.

The virtual infrastructure providing units 151 to 15m provide, as a plurality of virtual objects, virtual infrastructures built by assigning at least one virtual object provided by the virtual infrastructure providing units 151 to 15m including themselves, or the virtual device providing units 161 to 16n. For example, the virtual infrastructure providing unit 151 of FIG. 2 partitions a virtual infrastructure into 3 virtual objects 1511 to 1513 to be provided. It is to be noted that the number of virtual objects provided by the respective virtual infrastructure providing units is not limited to 3, and can be changed as appropriate. In this way a generated virtual object is called by the virtual infrastructure providing units 151 to 15m or an upper level application program, to be used.

Information stored in the virtual infrastructure configuration storage unit 12 and the virtual object configuration storage unit 13 is updated together with a change of configuration of the control server 11, and is referred to when information is transmitted to a virtual infrastructure and a virtual object group forming a virtual infrastructure.

Figure 3:
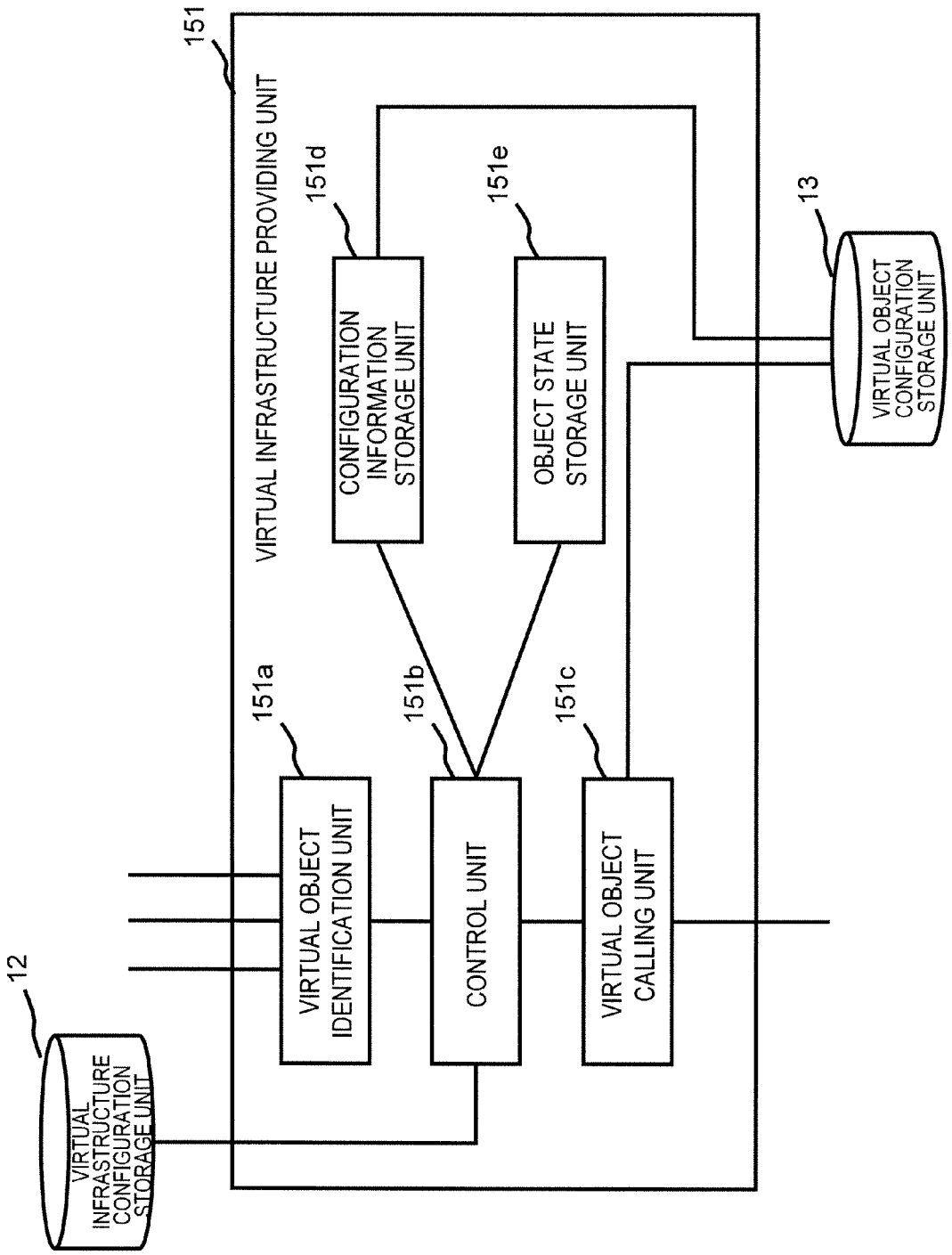
FIG. 3 is a block diagram representing a detailed configuration of a virtual infrastructure providing unit of FIG. 2.
Figure 4:
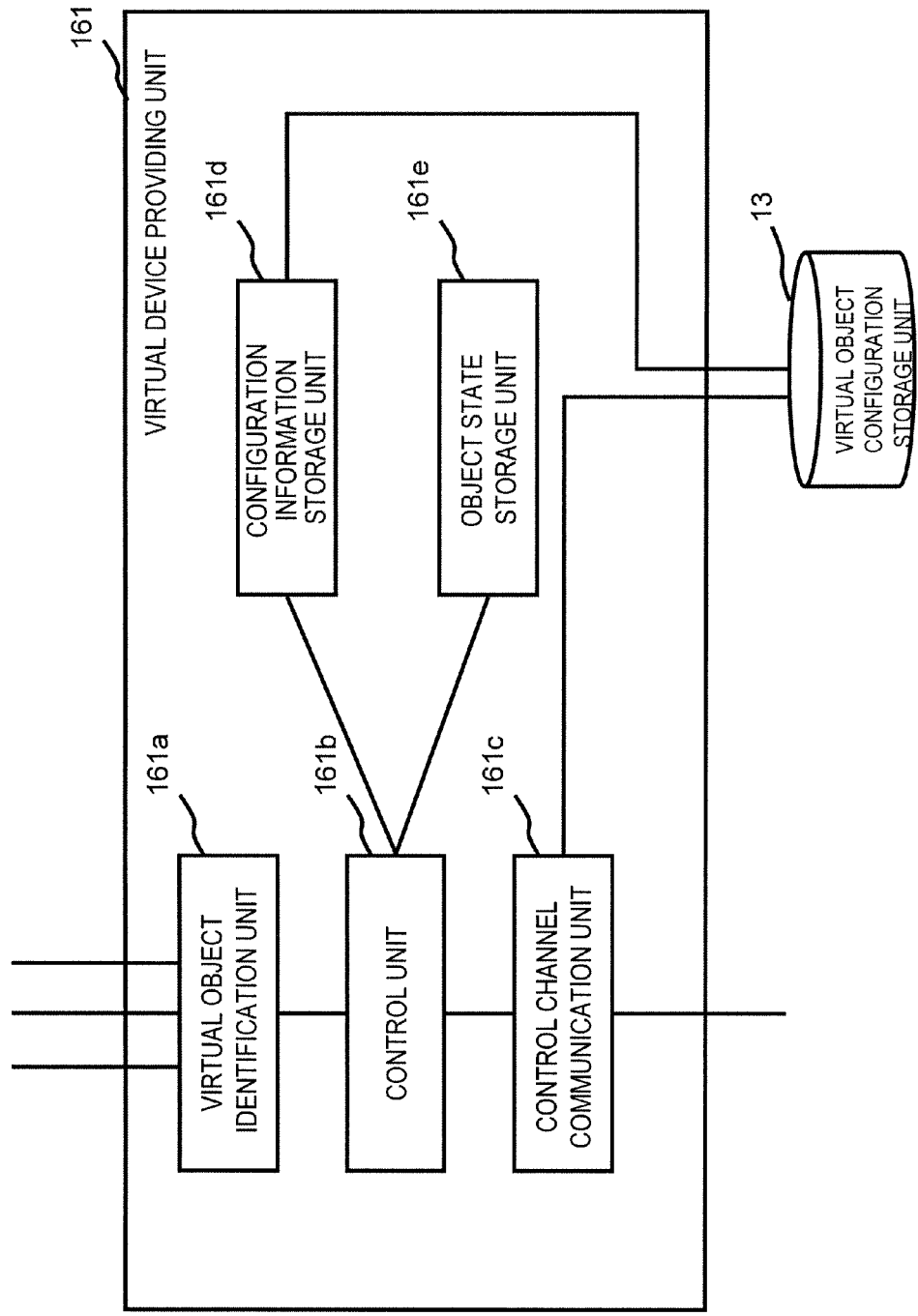
FIG. 4 is a block diagram representing a detailed configuration of a virtual device providing unit of FIG. 2.
Figure 5:
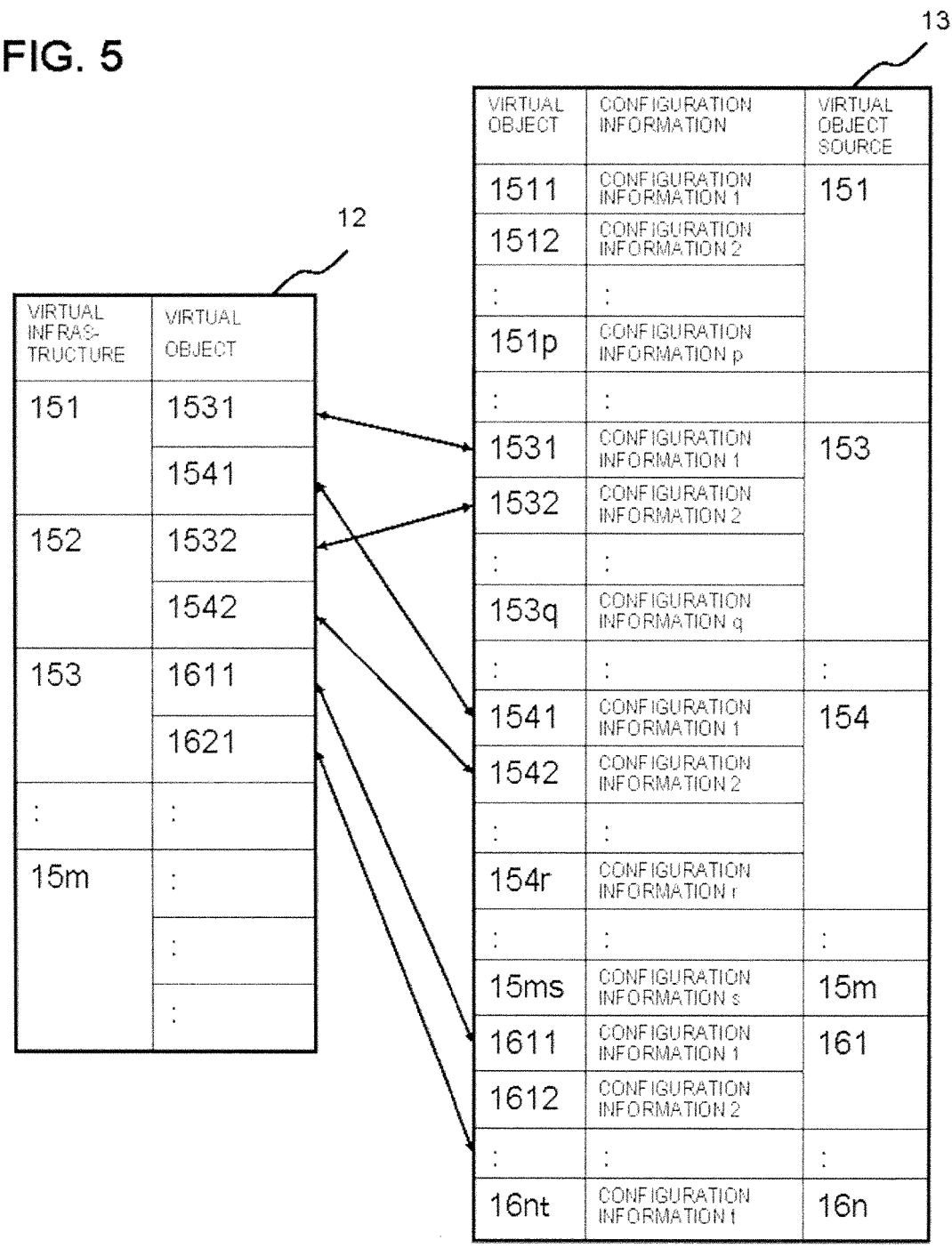
FIG. 5 is a diagram for describing a configuration of a virtual infrastructure configuration storage unit and a virtual object configuration storage unit of FIG. 2.

Next, a description is given concerning a detailed configuration of each part of the control server 11, making reference to FIG. 3 to FIG. 5.

FIG. 3 is a block diagram representing a detailed configuration of the virtual infrastructure providing unit 151 of the control server 11 of the first exemplary embodiment of the present invention. The virtual infrastructure providing unit 151 is configured by including: a virtual object identification unit 151a that identifies which object is called among a plurality of virtual objects (1511 to 1513 in FIG. 2) provided by the virtual infrastructure providing unit 151 itself, a control unit 151b configured by a program that operates an assigned virtual object to realize a function as an virtual infrastructure that is an object, a virtual object calling unit 151c that performs communication for operating an assigned virtual object, a configuration information storage unit 151d that holds configuration information (partition configuration information) among a plurality of virtual objects provided by the virtual infrastructure providing unit 151 itself, and an object state storage unit 151e that holds states of the virtual objects. The virtual infrastructure providing units 152 to 15m are configured similarly to the virtual infrastructure providing unit 151.

FIG. 4 is a block diagram representing a detailed configuration of the virtual device providing unit 161 of the control server 11 of the first exemplary embodiment of the present invention. The virtual device providing unit 161 is configured by including: a virtual object identification unit 161a that identifies which object is called among a plurality of virtual objects (for example, 16n1 to 16n3 in a case of the virtual device providing unit 16n of FIG. 2) provided by the virtual device providing unit 161, a control unit 161b that is configured by a program that controls the data plane device 191 assigned based on given control information, a control channel communication unit 161c that performs communication in order to communicate with the data plane device 191, a configuration information storage unit 161d that holds configuration information (partition configuration information) among a plurality of virtual objects provided by the virtual device providing unit 161 itself, and an object state storage unit 161e that holds states of the virtual objects. The virtual device providing units 162 to 16n are configured similarly to the virtual device providing unit 161.

FIG. 5 is a diagram for describing a configuration of a virtual infrastructure configuration storage unit 12 and a virtual object configuration storage unit 13 of the control server 11 of the first exemplary embodiment of the present invention. The virtual infrastructure configuration storage unit 12 is configured by a table or the like that stores a configuration of assigned virtual objects, with respect to virtual infrastructures built by the virtual infrastructure providing units 151 to 15m of the control server 11. For example, since the virtual infrastructure providing unit 151 of FIG. 2 assigns virtual objects of the virtual infrastructure providing unit 153 and the virtual infrastructure providing unit 154, as shown in FIG. 5, the virtual infrastructure providing unit 151 and the virtual objects 1531 and 1541 are associated and stored.

The virtual object configuration storage unit 13 is configured by a table or the like that stores a configuration of whether respective virtual objects generated inside the control server 11 are provided by a virtual infrastructure providing unit or a virtual device providing unit. Furthermore, configuration information of the virtual object configuration storage unit 13 of FIG. 5 is information (partition configuration information) concerning configuration among a plurality of virtual objects, and corresponds to configuration information (partition configuration information) of the configuration information storage units 151d and 161d of FIG. 3 and FIG. 4.

It is to be noted that the configuration information of the abovementioned virtual infrastructure configuration storage unit 12 and the virtual object configuration storage unit 13 may be managed as an independent storage unit as shown in FIG. 5, but it is also possible to use a configuration for storing as respective internal information in the respective virtual infrastructure providing units 151 to 15*m*.

In this way, according to the 2 storage units of the virtual infrastructure configuration storage unit 12 and the virtual object configuration storage unit 13, a recursive relationship or hierarchical structure of the virtual infrastructure is described. For example, it is possible to describe a relationship where the virtual object 1511 provided by the virtual infrastructure providing unit 151 is used by the virtual infrastructure providing unit 151 again.

Next, a detailed description of operation of the present exemplary embodiment is described using the drawings. Assume that the virtual device providing units 161 to 16*n* perform control of the respective data plane devices 191 to 19*n* corresponding respectively thereto, using control channels, and also generate a plurality of virtual objects corresponding to the respective data plane devices. It is to be noted that in the present exemplary embodiment, a description is given in which a data plane device and a virtual device providing unit correspond one-to-one, but it is possible to use a configuration having one virtual device providing unit corresponding to a plurality of physical resources.

First, making reference to FIG. 4, a description is given of a case where a control instruction has been given to a virtual object provided by the virtual device providing unit 161, that is, the data plane device 191, from a virtual infrastructure providing unit or an upper level application thereof. When the control instruction is given to the virtual device providing unit 161, the virtual object identification unit 161*a* identifies to which virtual object the control instruction has been given.

The control unit 161*b* reads state and configuration information of the identified virtual object from an object state storage unit 161*e* and the configuration information storage unit 161*d*, and performs processing in accordance with the given control instruction. Where necessary as a result of the processing, the control unit 161*b* outputs a further control instruction to the data plane device 191 via the control channel communication unit 161*c*.

Conversely when some kind of information is received via the control channel communication unit 161*c* from the data plane device 191, the control unit 161*b* causes the virtual object identification unit 161*a* to identify a virtual object assigned with regard to this information, and then refers to the virtual infrastructure configuration storage unit 12 to determine a virtual infrastructure providing unit to which the virtual object in question is assigned, and notifies the relevant information to the virtual infrastructure providing unit in question.

Next, a description is given concerning operation of the virtual infrastructure providing units 151 to 15*m* that give control instructions to virtual object sources of the virtual infrastructure providing units 151 to 15*m*, or the abovementioned virtual device providing units 161 to 16*n*.

Here, making reference to FIG. 3, a description is given of a case where a control instruction is given to a virtual object provided by the virtual infrastructure providing unit 151. As shown in FIG. 3, when a control instruction is given to the virtual infrastructure providing unit 151, the virtual object identification unit 151*a* identifies to which virtual object the control instruction has been given.

The control unit 151*b* reads state and configuration information of the identified virtual object from the object state storage unit 151*e* and the configuration information storage unit 151*d*, and performs processing in accordance with the given control instruction. Where necessary, as a result of the processing, the control unit 151*b* refers to the virtual infrastructure configuration storage unit 12 and the virtual object configuration storage unit 13, determines a source of the virtual object in question, among virtual objects assigned to the virtual infrastructure providing unit 151 in question, and outputs a further control instruction together with the determined virtual object information via the virtual object calling unit 151*c*.

Conversely, when some kind of information is received from the virtual infrastructure providing units 151 to 15*m* or the virtual device providing units 161 to 16*n* that provide virtual object(s) assigned to the virtual infrastructure providing unit 151, the control unit 151*b* causes the virtual object identification unit 161*a* to identify a virtual object(s) assigned with regard to this information, and then refers to the virtual infrastructure configuration storage unit 12, to determine a virtual infrastructure providing unit to which the virtual object(s) in question is assigned, and gives notification of the relevant information.

As described above, according to the present exemplary embodiment, it is possible to build a virtual infrastructure hierarchically (recursively, as necessary) connecting a plurality of virtual infrastructure providing units so that another virtual infrastructure providing unit gives a control instruction to a certain virtual infrastructure providing unit.

Figure 6:
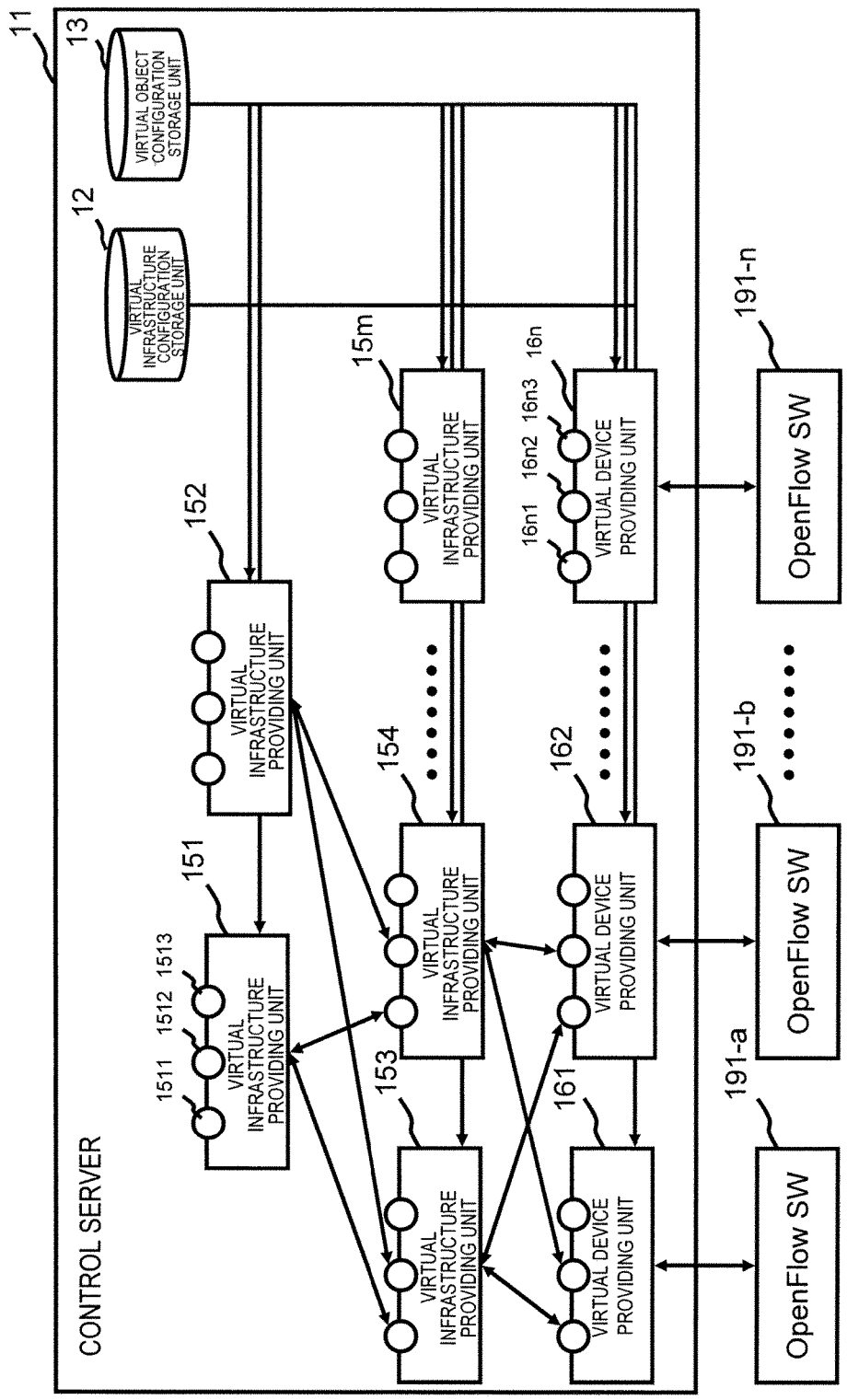
FIG. 6 is a diagram showing a specific configuration example of the present invention.

For example, as shown in FIG. 6, in a case where, as data plane devices. OpenFlow switches 191-*a* to 191-*n* of Non-Patent Document 1 are connected, the control server 11 controls the OpenFlow switches 191-*a* to 191-*n* using an OpenFlow protocol, and performs flow control.

For example, if a rule, which outputs a packet having a specific header to a specific port via a control channel, is transmitted as a control instruction to the OpenFlow switches 191-*a* to 191-*n*, these OpenFlow switches perform packet processing in accordance with the control instruction.

Here, by separately preparing a rule group as described above for each virtual device (virtual switch) that virtualizes an OpenFlow switch, it is possible to use one OpenFlow switch for several virtual switches.

That is, the virtual device providing units 161 to 16*n* respectively hold rule groups for each virtual object in respective object state storage units thereof (161*e* in FIG. 4). After adjustment so that conflict does not occur between appropriate rules in accordance with configuration information held in the respective configuration information storage units (161*d* in FIG. 4), these rules are transmitted to the OpenFlow switch. Here, with regard to the abovementioned adjustment, for example, implementation is possible by performing mapping or separation of ID spaces so that conflict does not occur between the same ID spaces (port number, VLAN number, other header information, or the like) among virtual devices. It is to be noted that, with respect to the abovementioned rules, it is possible to use what is called a flow table in Non-Patent Document 1, or something similar to a FIB (Forwarding Information Base).

It is possible to build a virtual infrastructure that functions to realize topology discovery by using a virtual object provided by the virtual device providing units 161 to 16*n* as described above, or a virtual infrastructure that functions as a shortest path computation means or load balancing measuring means. Furthermore, it is possible to build a virtual object equivalent to a virtual infrastructure and an upper layer virtual infrastructure using a virtual switch.

Figure 7:
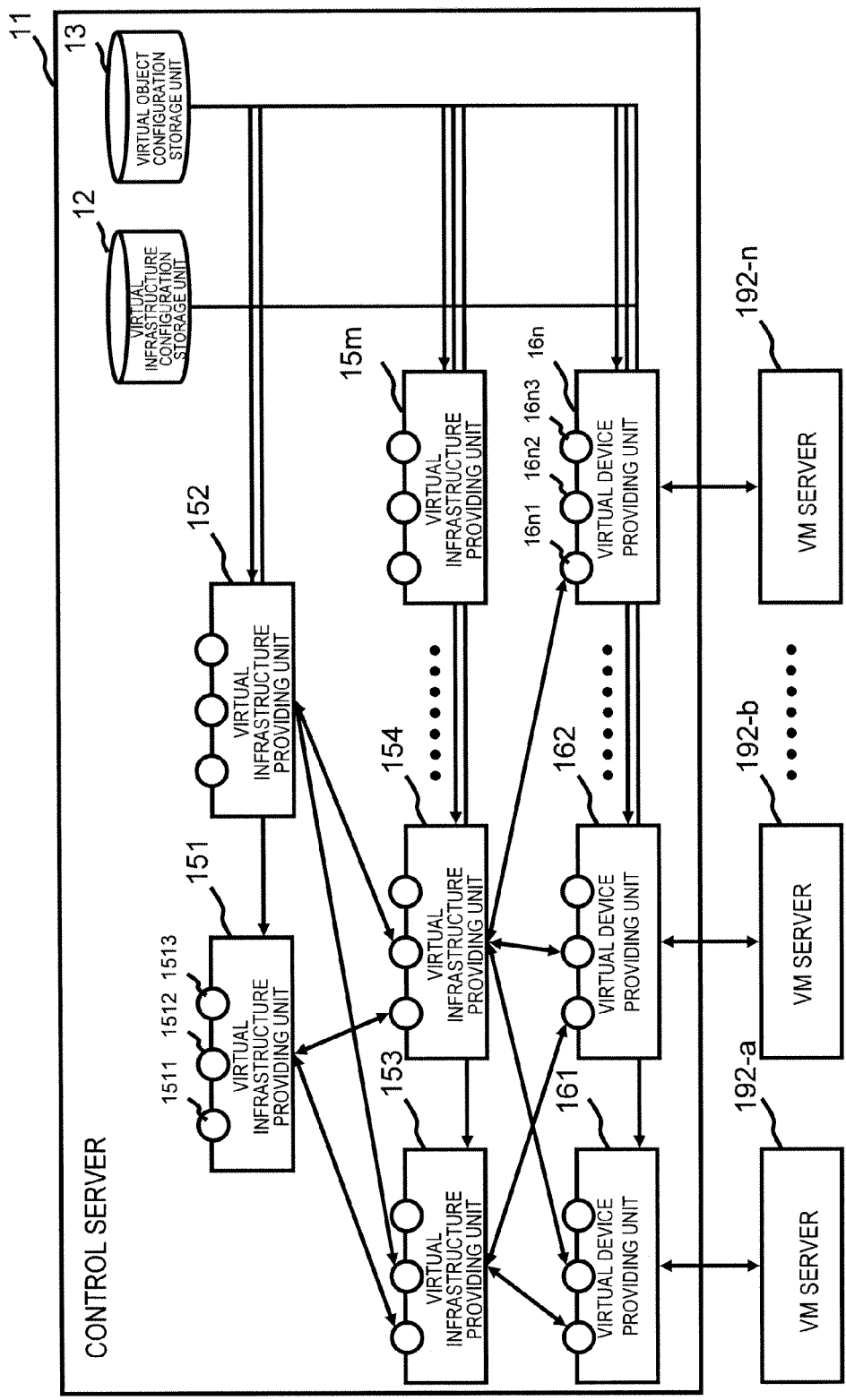
FIG. 7 is a diagram showing a specific configuration example of the present invention.

For example, as shown in FIG. 7, a case may be considered in which servers (VM servers) 192-*a* to 192-*n* provided with virtualizing functions are connected, as data plane devices. A plurality of virtual machines operate on these VM servers 192-*a* to 192-*n*, and this plurality of virtual machines are assigned as virtual objects to the virtual infrastructure providing units 151 to 15*m*. In this case, the virtual device providing units 161 to 16*n* can give control instructions such as to move, stop, or the like, to the virtual machines.

A description of a specific application example of the present invention is given, making reference to FIG. 8 to FIG. 12. It is to be noted that in the description using FIG. 8 to FIG. 12 as follows, the virtual infrastructure configuration storage unit 12 and the virtual object configuration storage unit 13 are omitted.

Figure 8:
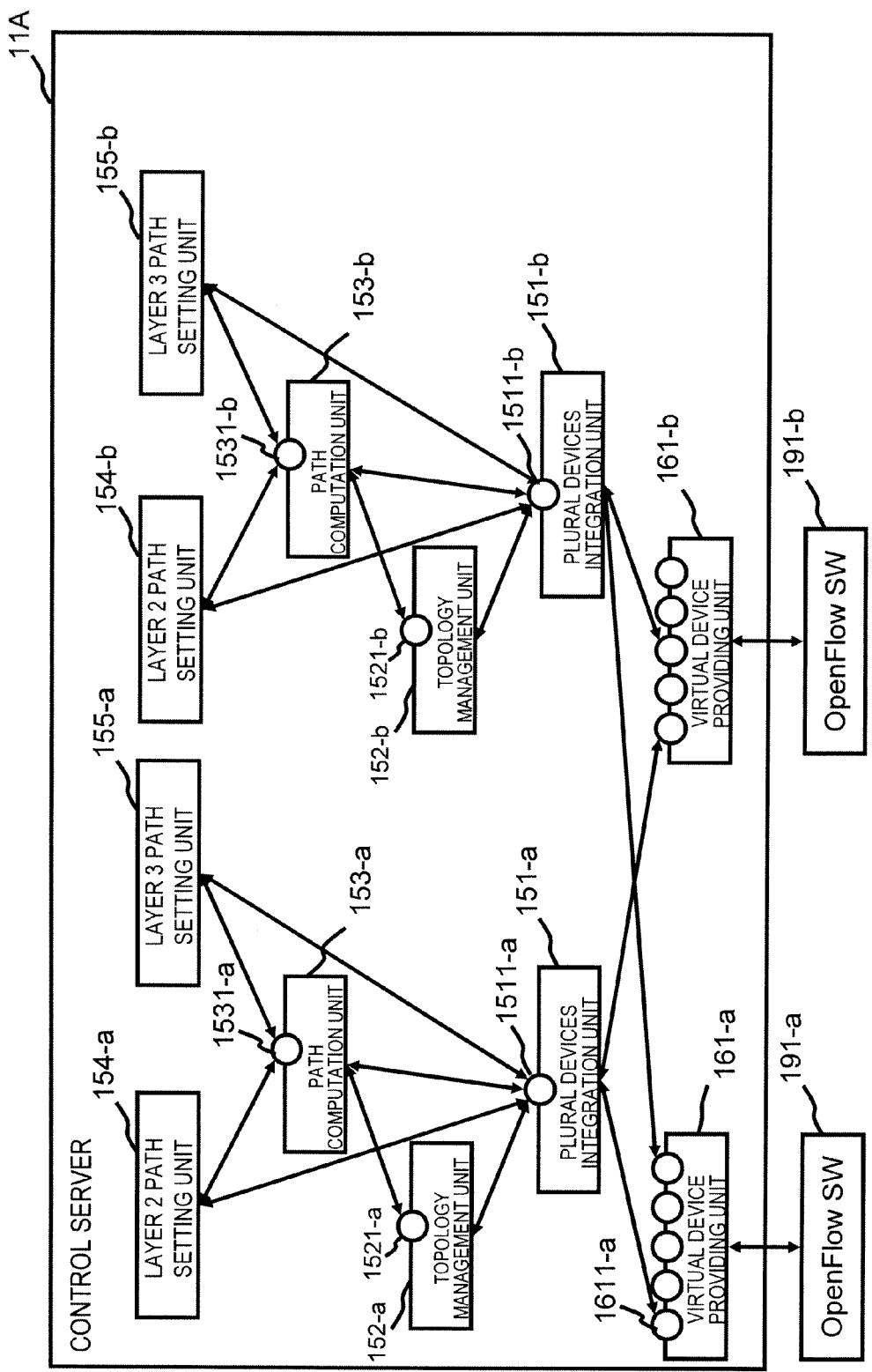
FIG. 8 is an example of a hierarchical configuration of an object in a case of creating two virtual networks using the present invention.

FIG. 8 is a diagram representing a configurations of an actual device, a virtual device, and a virtual infrastructure, in a case of creating 2 virtual networks. Similarly to FIG. 6, the virtual device providing units 161-*a* and 161-*b* of FIG. 8 provide virtual switch objects (for example, 1611-*a*) obtained by virtualizing OpenFlow switches 191-*a* and 191-*b*, to virtual infrastructure providing units.

In the example of FIG. 8, plural devices integration units 151-*a* and 151-*b*, topology management units 152-*a* and 152-*b*, path computation units 153-*a* and 153-*b*, layer 2 path setting units 154-*a* and 154-*b*, and layer 3 path setting units 155-*a* and 155-*b* are built, as virtual infrastructure providing units.

The plural devices integration units 151-*a* and 151-*b* of FIG. 8 provide virtual infrastructures that respectively control the OpenFlow switches 191-*a* and 191-*b*. The topology management units 152-*a* and 152-*b* provide management functions for network topology using the virtual network objects 1511-*a* and 1511-*b* provided by the abovementioned plural devices integration units 151-*a* and 151-*b*. The path computation units 153-*a* and 153-*b* provide virtual infrastructures to obtain a path (route) using the abovementioned virtual network objects and topology objects 1521-*a* and 1521-*b* provided by the topology management units 152-*a* and 152-*b*. The layer 2 path setting units 154-*a* and 154-*b*, and the layer 3 path setting units 155-*a* and 155-*b*, respectively perform layer 2 and layer 3 path setting processing using the abovementioned virtual network objects and the path setting objects 1531-*a* and 1531-*b* provided by the path computation units 153-*a* and 153-*b*.

When called by other virtual infrastructure providing units (for example, the path computation units 153-*a* and 153-*b*), the virtual network objects 1511-*a* and 1511-*b* provided by the plural devices integration units 151-*a* and 151-*b* select and call appropriate virtual switch objects (for example, the virtual switch object 1611-*a*) from among the virtual switch objects assigned to themselves. Furthermore, when data is inputted from a virtual switch object (for example, the virtual switch object 1611-*a*), the plural devices integration units 151-*a* and 151-*b* make appropriate selections from the plurality of virtual infrastructure providing units (for example, the topology management units 152-*a* and 152-*b*, the path computation units 153-*a* and 153-*b*, or the like) that use provided virtual network objects, and send data thereto.

In the same way, when called by other virtual infrastructure providing units (for example, the layer 2 path setting units 154-*a* and 154-*b*), the path setting objects 1531-*a* and 1531-*b* provided by the path computation units 153-*a* and 153-*b* select and call appropriate virtual objects (for example, topology objects 1521-*a* and 1521-*b*) from among virtual switch objects (in the example of FIG. 8, the topology objects 1521-*a* and 1521-*b*, and the virtual network objects 1511-*a* and 1511-*b*) assigned to themselves, to obtain the topology. The path setting objects 1531-*a* and 1531-*b* send a command for computing a path in a virtual network in accordance with this topology, calling the virtual network objects 1511-*a* and 1511-*b*, and setting the path.

In this way, it is possible for each of the virtual objects provided by the virtual infrastructure providing units to control appropriate virtual objects from among (low level) virtual objects used for forming the virtual infrastructure in question. Control information is transmitted, tracing back hierarchical relationships in time order, so that the (low level) virtual objects in question further control appropriate virtual objects from among virtual objects assigned to the themselves. Data flow in a reverse direction is similar, and data outputted from the (low level) virtual objects is transmitted to virtual objects selected from among (high level) virtual objects that use the (low level) virtual objects in question.

It is to be noted that in the example of FIG. 8 a description has been given in which 2 virtual networks are created, but it is also possible to build 3 or more virtual networks by adding a set or sets of an OpenFlow switch and virtual device providing unit. Furthermore, it is also possible to build additional virtual infrastructures using virtual objects provided by respective virtual infrastructure providing units and the virtual device providing units described above.

Figure 9:
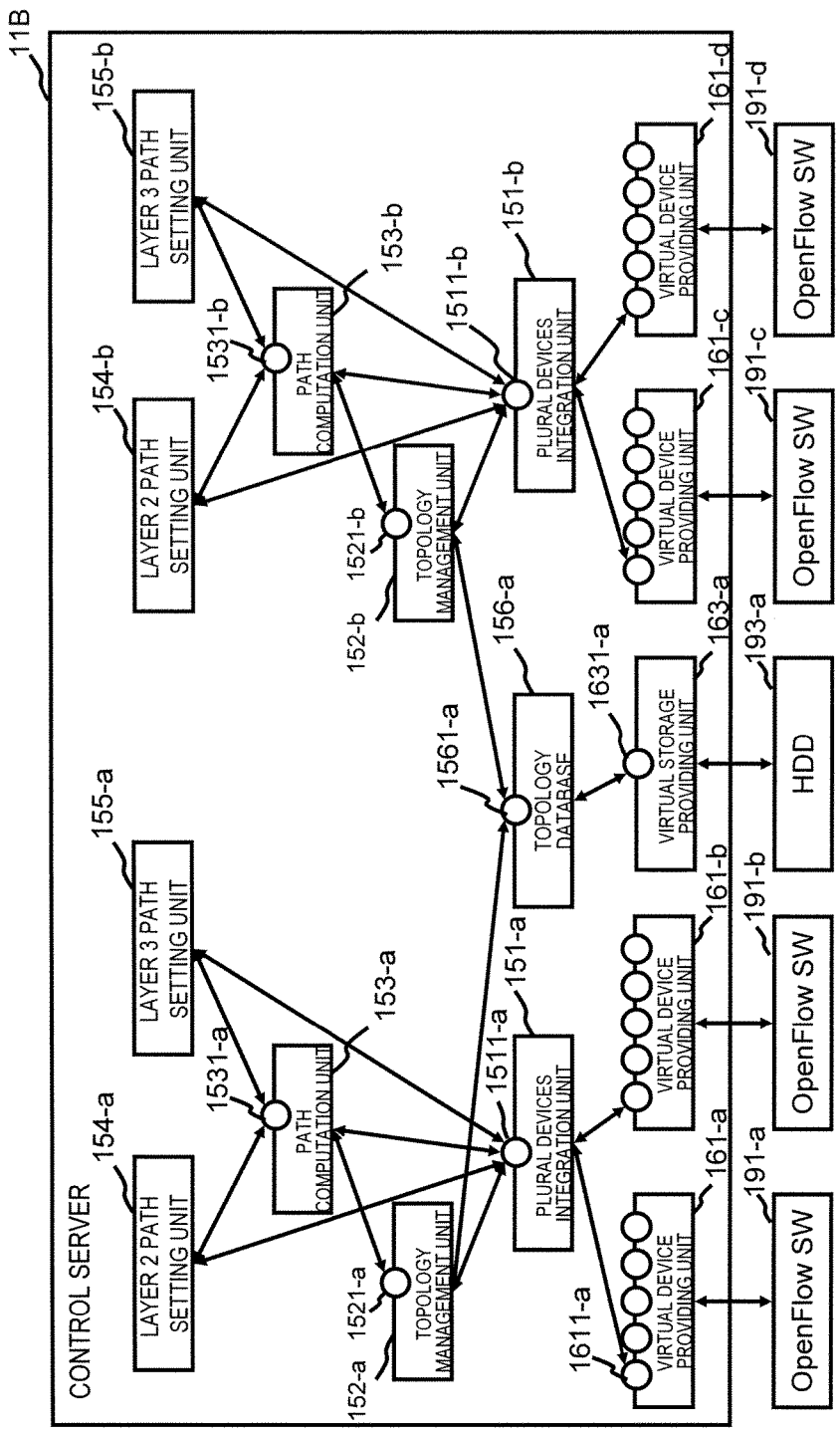
FIG. 9 is an example of a configuration in which a further modification is added to the configuration of FIG. 8.

FIG. 9 shows a configuration in which a scale out is performed by further adding 2 OpenFlow switches to the configuration of FIG. 8. In the configuration of FIG. 9, in order to deal with the scale out, a HDD (Hard Disk Drive), and a virtual storage providing unit 163-*a* that provides a virtual storage object 1631-*a* as a virtual device providing unit are added, and a topology database 156-*a* that provides a virtual database object 1561-*a* to the topology management units 152-*a* and 152-*b* as a virtual infrastructure providing unit, is added.

Figure 10:
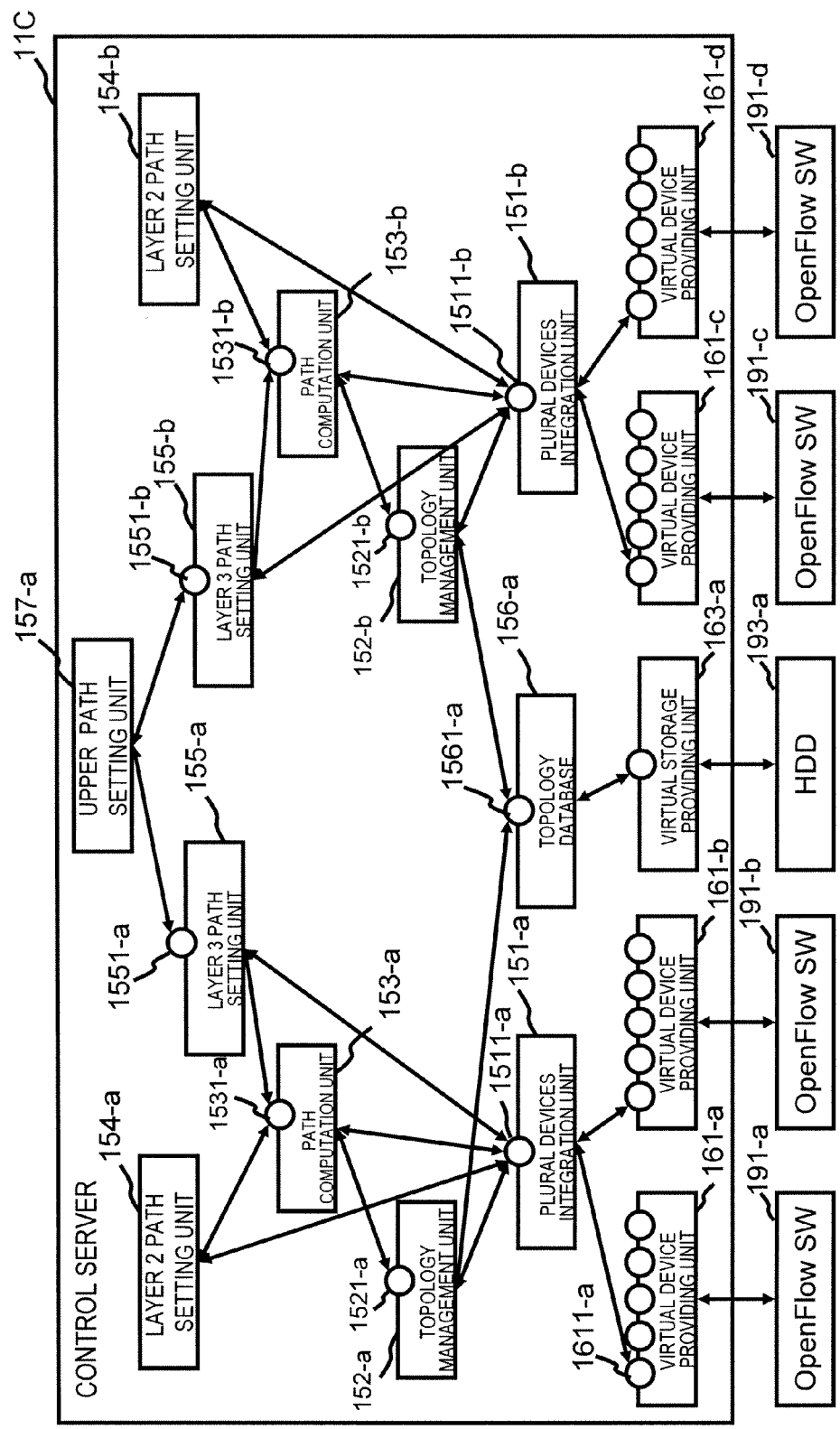
FIG. 10 is an example of a configuration in which a further modification is added to the configuration of FIG. 9.

FIG. 10 is an example in which the abovementioned path setting unit 157-*a* that performs high level layer path setting processing is added, using virtual network domain objects 1551-*a* and 1551-*b* provided by the layer 3 path setting units 155-*a* and 155-*b* in the configuration of FIG. 9.

Figure 11:
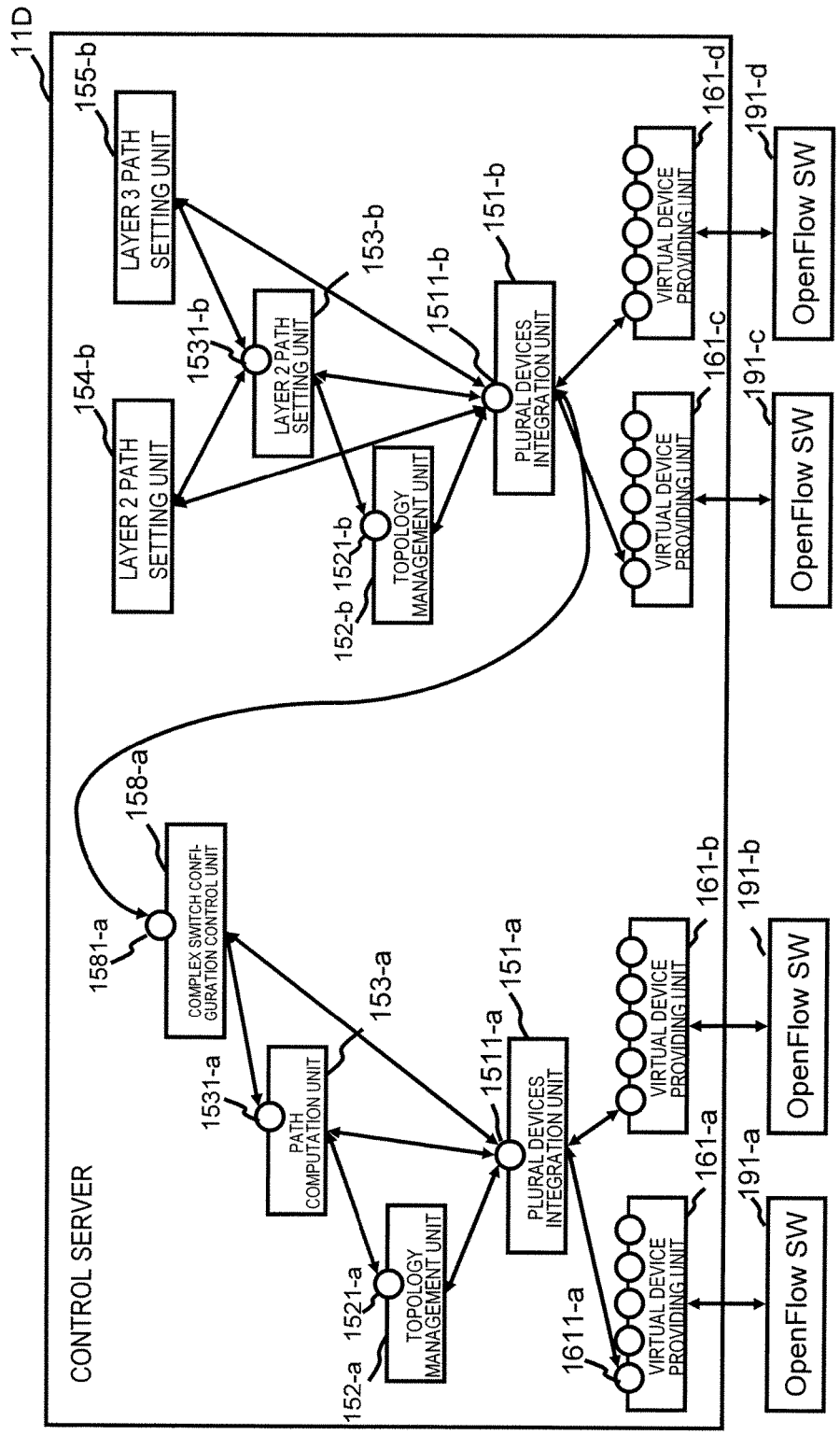
FIG. 11 is an example of a configuration of a virtual switch obtained by further modifying the configuration of FIG. 8.

Hierarchical relationships of virtual objects provided by the respective virtual infrastructure providing units described above can be freely set. FIG. 11 is an example where a complex switch configuration control unit 158-*a* providing a virtual infrastructure that controls the OpenFlow switches 191-*a* and 191-*b* is built, and a virtual switch object 1581-*a* provided by this complex switch configuration control unit 158-*a* is assigned to the plural devices integration unit 151-*b* that controls OpenFlow switches 191-*c* and 191-*d*. According to this configuration, it is possible to simulate virtual large scale switches by taking together, i.e., integrating a plurality of switches.

Figure 12:
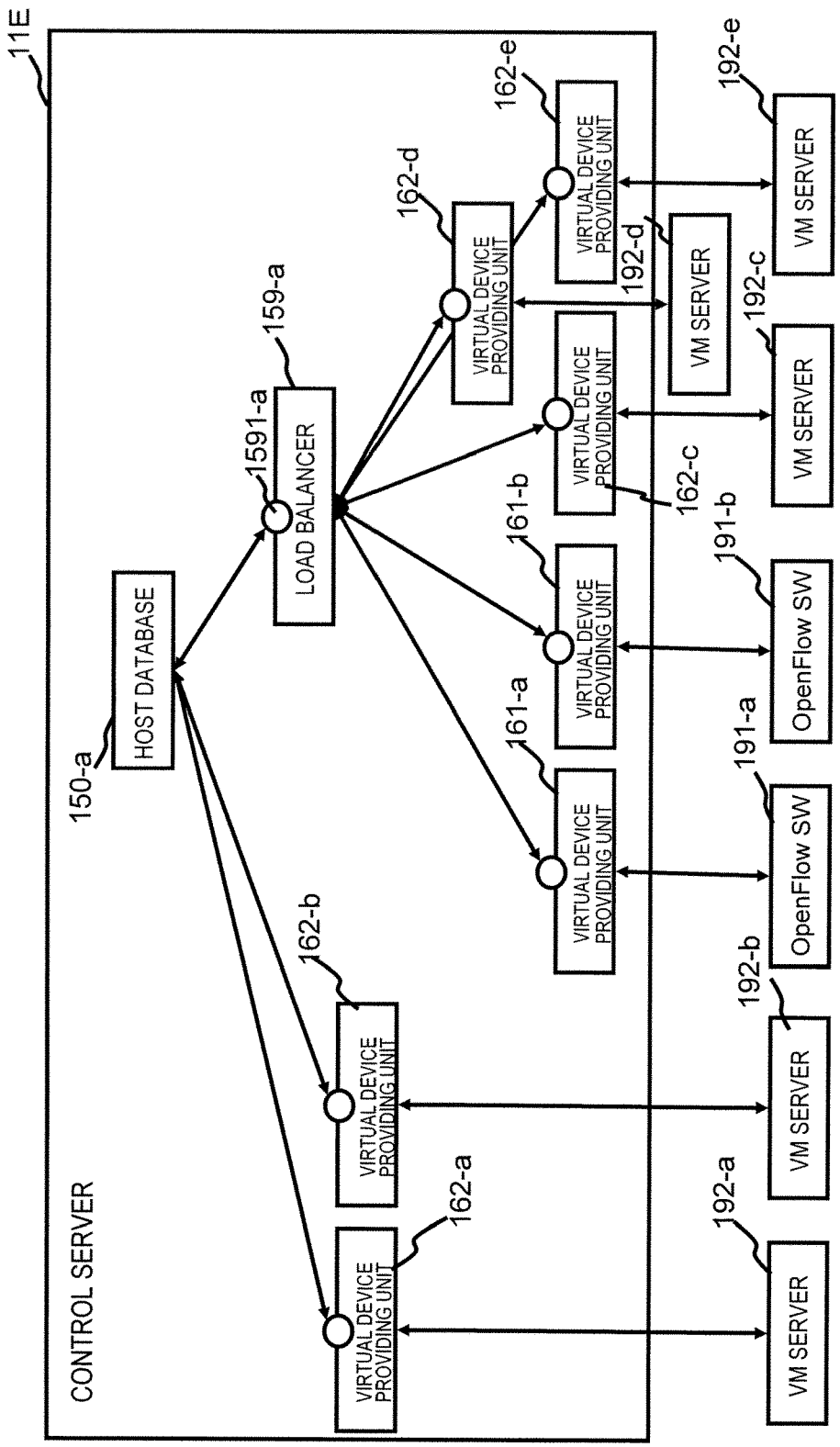
FIG. 12 is an example of a hierarchical configuration including an object in which a VM server is virtualized using the present invention.

FIG. 12 shows a configuration in which VM (Virtual Machine) servers 192-*a* to 192-*e* and OpenFlow switches 191-*a* and 192-*b*, which are connected as physical resources, are respectively virtualized and load balance processing is performed. A load balancer 159-*a* provides a server object 1591-*a* that performs load balance processing of the virtual device providing units 161-*a*, 161-*b*, and 162-*c* to 162-*e*. Server objects obtained by virtualizing the server object 1591-*a* and the VM servers 192-*a* and 192-*b* are assigned with respect to a host database 150-*a*. In the example of FIG. 12, the server objects obtained by virtualizing the VM servers 192-*a* to 192-*b* are located in a layer higher than the server objects obtained by virtualizing the VM servers 192-*c* to 192-*e*, but it is possible to freely change hierarchical relationships thereof.

Exemplary embodiments of the present invention has been described above, but the present invention is not limited to the abovementioned exemplary embodiments, and further modifications, substitutions, and adjustments can be added within a scope that does not depart from fundamental technological concepts of the present invention. For example, in each of the exemplary embodiments described above, a description has been given of examples where an OpenFlow switch or a VM server is controlled, but data plane devices such as various types of routers, communication nodes, or the like, can clearly be used in integrated control of physical resources such as various types of monitoring probes or base station apparatuses, various types of servers and storage, and the like, arranged in a network.

Furthermore, in each of FIG. 1 to FIG. 7, for example, the virtual infrastructure configuration storage units and the virtual device providing units are shown to provide 3 virtual objects respectively, but the numbers of virtual objects thus provided are merely by way of examples, and configurations are possible in which the virtual infrastructure configuration storage units and the virtual device providing unit(s) respectively provide a required number of virtual objects.

In the following, preferred modes are summarized.

Mode 1. A control server comprising:
a virtual device providing unit(s) that provides at least one virtual object for controlling a physical resource(s); and
a virtual infrastructure providing unit(s) that can provide, as a virtual object(s), a virtual infrastructure(s) configured by using at least one virtual object provided by said virtual device providing unit(s); wherein
said virtual infrastructure providing unit(s) can configure a virtual infrastructure(s) using a virtual object(s) provided by said virtual infrastructure providing unit(s), and can provide said virtual infrastructure(s) as a virtual object(s).

Mode 2. The control server according to mode 1, wherein said virtual infrastructure providing unit(s) provides, as a virtual object(s), said virtual infrastructure(s), by creating a new virtual object(s) that controls a virtual object(s) used for configuring said virtual infrastructure(s).

Mode 3. The control server according to mode 1 or 2, comprising:
a virtual infrastructure configuration storage unit(s) that stores a virtual object(s) assigned to each of said virtual infrastructure(s); and
a virtual object configuration storage unit that stores information of the virtual infrastructure providing unit(s) or the virtual device providing unit(s) and that is a source of each of said virtual object(s); wherein
reference is made to information stored in said virtual infrastructure configuration storage unit and said virtual object configuration storage unit, to cause to transmit control information to said virtual infrastructure(s) and a virtual object(s) forming said virtual infrastructure(s).

Mode 4. The control server according to any one of modes 1 to 3, wherein each of said virtual device providing unit(s) and each of said virtual infrastructure providing unit(s) respectively comprise a configuration information storage unit that stores partition configuration information of a virtual object(s), in order to provide the virtual object(s) to plural virtual infrastructure providing devices.

Mode 5. The control server according to any one modes 1 to 4, wherein said virtual device providing unit comprises:
a virtual object identification unit that identifies a virtual object called from among a plurality of virtual objects being provided, based on inputted control information;
a control unit that performs processing in accordance with control information given to said identified virtual object; and
a control channel communication unit that performs transmitting and receiving of information with respect to specified one of said physical resource(s) connected via a control channel.

Mode 6. The control server according to any one of modes 1 to 5, wherein said virtual infrastructure providing unit comprises:
a virtual object identification unit that identifies a virtual object called from among a plurality of virtual objects being provided, based on inputted control information;
a control unit that performs processing in accordance with control information given to said identified virtual object; and
a virtual object calling unit that calls a virtual object assigned to said virtual infrastructure providing unit, in accordance with a result of said processing.

Mode 7. The control server according to any one of modes 1 to 6, wherein said physical resource(s) is a data plane device(s), and functions as a control plane device(s).

Mode 8. A service providing system, comprising:
the control server according to any one of modes 1 to 7; and
a physical resource(s) controlled by said control server.

Mode 9. The service providing system according to mode 8, wherein said virtual infrastructure providing unit(s) of said control server provides, as a virtual object(s), said virtual infrastructure(s), by creating a new virtual object(s) that controls a virtual object(s) used for configuring said virtual infrastructure(s).

Mode 10. The service providing system according to mode 8 or 9, wherein said control server further comprises:
a virtual infrastructure configuration storage unit that stores a virtual object(s) assigned to each of said virtual infrastructure(s); and
a virtual object configuration storage unit that stores information of the virtual infrastructure providing unit(s) or the virtual device providing unit(s) and that is a source of each of said virtual object(s); wherein
reference is made to information stored in said virtual infrastructure configuration storage unit and said virtual object configuration storage unit, to cause to transmit control information to said virtual infrastructure(s) and a virtual object(s) forming said virtual infrastructure(s).

Mode 11. A method of creating a virtual infrastructure(s) comprising:
building a virtual infrastructure(s) by using a control server comprising a virtual device providing unit(s) that provides at least one virtual object for controlling a physical resource(s), and a virtual infrastructure providing unit(s) that can provide, as a virtual object(s), a virtual infrastructure(s) configured by using at least one virtual object provided by said virtual device providing unit(s), wherein
said virtual infrastructure providing unit(s) of said control server configures a virtual infrastructure(s) using a virtual object(s) provided by said virtual infrastructure providing unit(s), and provides said virtual infrastructure(s) as a virtual object(s).

Mode 12. The method of creating a virtual infrastructure(s) according to mode 11, wherein said virtual infrastructure providing unit(s) of said control server provides, as a virtual object(s), said virtual infrastructure(s), by creating a new virtual object(s) that controls a virtual object(s) used for configuring said virtual infrastructure(s).

Mode 13. The method of providing a virtual infrastructure according to mode 11 or 12, wherein said control server further comprises:

a virtual infrastructure configuration storage unit that stores a virtual object(s) assigned to each of said virtual infrastructure(s); and a virtual object configuration storage unit that stores information of the virtual infrastructure providing unit(s) or the virtual device providing unit(s) and that is a source of each of said virtual object(s); and wherein said control server makes reference to information stored in said virtual infrastructure configuration storage unit and said virtual object configuration storage unit, to cause to transmit control information to said virtual infrastructure(s) and a virtual object(s) forming said virtual infrastructure(s).

Mode 14. A program executed on a control server comprising a virtual device providing unit(s) that provides at least one virtual object for controlling a physical resource(s), and a virtual infrastructure providing unit(s) that can provide, as a virtual object(s), a virtual infrastructure(s) configured by using at least one virtual object provided by said virtual device providing unit(s); wherein said program controls said virtual infrastructure providing unit(s) so that said virtual infrastructure providing unit(s) configures a virtual infrastructure(s) using a virtual object(s) provided by said virtual infrastructure providing unit(s), and provides said virtual infrastructure(s) as a virtual object(s).

Mode 15. The program according to mode 14, wherein said virtual infrastructure(s) is provided as a virtual object(s), by executing a process of creating a new virtual object(s) that controls a virtual object(s) used for configuring said virtual infrastructure(s), by said virtual infrastructure providing unit(s) of said control server.

Mode 16. The program according to mode 14 or 15, wherein said control server further comprises:

a virtual infrastructure configuration storage unit that stores a virtual object(s) assigned to each of said virtual infrastructure(s); and a virtual object configuration storage unit that stores information of said virtual infrastructure providing unit(s) or said virtual device providing unit(s) and that is a source of each of said virtual object(s); and wherein said program executes a process to cause said control server to make reference to information stored in said virtual infrastructure configuration storage unit and said virtual object configuration storage unit, and to cause to transmit control information to said virtual infrastructure(s) and a virtual object(s) forming said virtual infrastructure(s).

In addition in the abovementioned exemplary embodiments, a description was given in which the physical resources (data plane devices) and the virtual device providing units respectively correspond one-to-one, but a configuration is also possible in which virtual objects are provided where one virtual device providing unit corresponds to a plurality of physical resources. Modifications and adjustments of exemplary embodiments and examples are possible within the bounds of the entire disclosure (including the scope of the claims) of the present invention, and also based on fundamental technological concepts thereof. Furthermore, a wide variety of combinations and selections of various disclosed elements is possible within the scope of the claims of the present invention. That is, the present invention clearly includes every type of transformation and modification that a person skilled in the art can realize according to the entire disclosure including the scope of the claims and to technological concepts thereof.

EXPLANATIONS OF SYMBOLS 11 control server
12 virtual infrastructure configuration storage unit
13 virtual object configuration storage unit
151 to 15m virtual infrastructure providing unit
151a, 161a virtual object identification unit
151b, 161b control unit
151c virtual object calling unit
151d, 161d configuration information storage unit
151e, 161e object state storage unit
161 to 16n virtual device providing unit
161c control channel communication unit
181 to 18n physical resource
191 to 19n data plane device
191-a to 191-n OpenFlow switch
192-a to 192-n server (VM server)
1511 to 1513, 16n1 to 16n3 virtual object
1511-a virtual network object
1521-a topology object
1531-a path setting object
1551-a virtual network domain object
1561-a virtual database object
1581-a virtual switch object
1591-a server object
1611-a virtual switch object
1631-a virtual storage object

What is claimed:

1. A control server comprising:
a memory; and
at least one processor configured to execute:
a first virtual device providing unit that provides a first virtual object for controlling a first switch by virtualizing the first switch;
a second virtual device providing unit that provides a second virtual object for controlling a second switch by virtualizing the second switch;
a first virtual infrastructure providing unit that provides, as a third virtual object, a first virtual infrastructure configured by using the first virtual object provided by the first virtual device providing unit;
a second virtual infrastructure providing unit that configures a second virtual infrastructure using the third virtual object provided by the first virtual infrastructure providing unit, and that provides the second virtual infrastructure as a fourth virtual object; and
a third virtual infrastructure providing unit that configures a third virtual infrastructure using the second virtual object provided by the second virtual device providing unit and the fourth virtual object provided by the second virtual infrastructure providing unit and that provides the third virtual infrastructure as a fifth virtual object;
wherein the first and second virtual device providing units and the first, second and third virtual infrastructure providing units form at least a portion of a virtual network and simulate a virtual large scale switch integrating the first and second switches.

2. The control server according to claim 1, wherein the first, second and third virtual infrastructure providing units each provide, the third to fifth virtual objects, a respective virtual infrastructure, by creating new virtual objects that control virtual objects used for configuring the respective virtual infrastructure.

3. The control server according to claim 1, wherein each of the first and second virtual device providing units and each of the first, second and third virtual infrastructure providing units respectively comprise a configuration information storage unit that stores partition configuration information of a particular virtual object, in order to provide the particular virtual object to plural virtual infrastructure providing devices.

4. The control server according to claim 1 wherein the first virtual device providing unit comprises:
   a virtual object identification unit that identifies a virtual object called from among a plurality of the first virtual objects being provided, based on an inputted control instruction;
   a control unit that performs processing in accordance with a control instruction given to the identified virtual object; and
   a control channel communication unit that performs transmitting and receiving of information with respect to a specified one of the first and second switches connected via a control channel.

5. The control server according to claim 1, wherein the first, second and third virtual infrastructure providing units comprise:
   a virtual object identification unit that identifies a virtual object called from among a plurality of the third to fifth virtual objects being provided, based on an inputted control information;
   a control unit that performs processing in accordance with control information given to the identified virtual object; and
   a virtual object calling unit that calls a virtual object assigned to a respective virtual infrastructure providing unit, in accordance with a result of the processing.

6. A service providing system, comprising:
   a memory; and
   at least one processor configured to execute:
      a first virtual device providing unit that provides a first virtual object for controlling a first switch by virtualizing the first switch;
      a second virtual device providing unit that provides a second virtual object for controlling a second switch by virtualizing the second switch;
      a first virtual infrastructure providing unit that provides, as a third virtual object, a virtual infrastructure configured by using the first virtual object provided by the first virtual device providing unit;
      a second virtual infrastructure providing unit that configures a second virtual infrastructure using the third virtual object provided by the first virtual infrastructure providing unit, and that provides the second virtual infrastructure as a fourth virtual object;
      a third virtual infrastructure providing unit that configures a virtual infrastructure using the second virtual object provided by the second virtual device providing unit and the fourth virtual object provided by the second virtual infrastructure providing unit, and that provides the third virtual infrastructure as a fifth virtual object;
   wherein the first switch and the second switch are controlled by a control server.

7. The service providing system according to claim 6, wherein the first, second and third virtual infrastructure providing units of the control server provide, as the third to fifth objects, a respective virtual infrastructure, by creating new virtual objects that control virtual objects used for configuring the respective virtual infrastructure.

8. A method of creating a virtual infrastructure, the method comprising:
   building a virtual infrastructure by using a control server comprising a first virtual device providing unit that provides a first virtual object for controlling a first switch by virtualizing the first switch, and a first virtual infrastructure providing unit that provides, as a third virtual object, a first virtual infrastructure configured by using the first virtual object provided by the first virtual device providing unit;
   by using a second virtual device providing unit of the control server that provides a second virtual object for controlling a second switch by virtualizing the second switch and a second virtual infrastructure providing unit of the control server, and configuring a second virtual infrastructure using the third virtual object provided by the first virtual infrastructure providing unit, and providing the second virtual infrastructure as a fourth virtual object; and
   by a third virtual infrastructure providing unit of the control server, configuring a third virtual infrastructure using the second virtual object provided by the second virtual device providing unit and the fourth virtual object provided by the second virtual infrastructure providing unit, and providing the third virtual infrastructure as a fifth virtual object,
   wherein the first and second virtual device providing units and the first, second and third virtual infrastructure providing units form at least a portion of a virtual network and simulate a virtual large scale switch integrating the first and second switches.

9. The method of creating a virtual infrastructure according to claim 8, wherein the first, second and third virtual infrastructure providing units of the control server provide, as the third to fifth objects, a respective virtual infrastructure, by creating new virtual objects that control virtual objects used for configuring the respective virtual infrastructure.

10. A non-transitory computer-readable recording medium storing a program to be executed on a control server comprising:
   a first virtual device providing unit that provides a first virtual object for controlling a first switch by virtualizing the first switch, and a first virtual infrastructure providing unit that provides, as a third virtual object, a first virtual infrastructure configured by using the first virtual object provided by the first virtual device providing unit; wherein:
      the program controls a second virtual device providing unit of the control server that provides a second virtual object for controlling a second switch by virtualizing the second switch and controls a second virtual infrastructure providing unit of the control server so that the second virtual infrastructure providing unit configures a second virtual infrastructure using the third virtual object provided by the first virtual infrastructure providing unit, and provides the second virtual infrastructure as a fourth virtual object, and
      the program controls a third virtual infrastructure providing unit of the control server so that the third virtual infrastructure providing unit configures a third virtual infrastructure using the second virtual object provided by the second virtual device providing unit and the fourth virtual object provided by the second virtual infrastructure providing unit, and provides the third virtual infrastructure as a fifth virtual object.

11. The control server according to claim 2, wherein each of the first and second virtual device providing units and each of the first, second and third virtual infrastructure providing units respectively comprise a configuration information storage unit that stores partition configuration information representing a relation between a particular virtual object comprising the first and second virtual device providing units and the first, second and third virtual infrastructure providing units which provide the particular virtual object to the first and second virtual device providing units, in order to provide the particular virtual object to the first, second and third virtual infrastructure providing units.

12. The control server according to claim 1, wherein each of the first and second virtual device providing units and each of the first, second and third virtual infrastructure providing units respectively comprise a configuration information storage unit that stores partition configuration information representing a relation between a particular virtual object comprising the first and second virtual device providing units and the first, second and third virtual infrastructure providing units which provide the particular virtual object to the first and second virtual device providing units, in order to provide the particular virtual object to the first, second and third virtual infrastructure providing units.

13. The control server according to claim 2, wherein the first virtual device providing unit comprises:
 a virtual object identification unit that identifies a virtual object called from among a plurality of virtual objects being provided, based on inputted control information;
 a control unit that performs processing in accordance with control information given to the identified virtual object; and
 a control channel communication unit that performs transmitting and receiving of information with respect to a specified one of the first and second switches connected via a control channel.

14. The control server according to claim 1, wherein the first virtual device providing unit comprises:
 a virtual object identification unit that identifies a virtual object called from among a plurality of virtual objects being provided, based on inputted control information;
 a control unit that performs processing in accordance with control information given to the identified virtual object; and
 a control channel communication unit that performs transmitting and receiving of information with respect to a specified one of the first and second switches connected via a control channel.

15. The control server according to claim 3, wherein the first virtual device providing unit comprises:
 a virtual object identification unit that identifies a virtual object called from among a plurality of virtual objects being provided, based on inputted control information;
 a control unit that performs processing in accordance with control information given to the identified virtual object; and
 a control channel communication unit that performs transmitting and receiving of information with respect to a specified one of the first and second switches connected via a control channel.

16. The service providing system according to claim 7, wherein the control server further comprises:

a virtual infrastructure configuration storage unit that stores a virtual object assigned to each of the virtual infrastructures; and
a virtual object configuration storage unit that stores information indicative of the first, second and third virtual infrastructure providing units or the first and second virtual device providing units that comprises a source of each of the virtual objects; wherein
reference is made to information stored in the virtual infrastructure configuration storage unit and the virtual object configuration storage unit, to cause to transmit control information to the virtual infrastructures and a virtual object forming the virtual infrastructures.

17. The control server according to claim 1, wherein one of the first, second and third virtual infrastructure providing units provides a layered virtualization of parent-child relationship, and configures a virtual infrastructure using a virtual object provided by another one of the first, second and third virtual infrastructure providing units.

18. The method of creating a virtual infrastructure according to claim 8, wherein one of the first, second and third virtual infrastructure providing units provides a layered virtualization of parent-child relationship, and configures a virtual infrastructure using a virtual object provided by another one of the first, second and third virtual infrastructure providing units.

19. The control server according to claim 1, wherein the first virtual device providing unit is configured to receive output of control information, distinguish the virtual object for controlling the first switch from among a plurality of virtual objects, to which the respective control information has been given, and having performed processing in accordance with the control information, output additional control information to a physical resource respectively associated thereto,
 wherein the first virtual infrastructure providing unit processes in accordance with the control information, the first virtual infrastructure providing unit outputs additional control information to a first virtual object being used, and
 wherein the second virtual infrastructure providing unit processes in accordance with the control information, and the second virtual infrastructure providing unit outputs additional control information to a second virtual object being used, and
 wherein the third virtual infrastructure providing unit processes in accordance with the control information, and the third virtual infrastructure providing unit outputs additional control information to a third virtual object being used.

20. The control server according to claim 1, wherein one of the first, second and third virtual infrastructure providing units provides a layered virtualization of parent-child relationship, and configures a virtual infrastructure using a virtual object provided by another one of the first, second and third virtual infrastructure providing units, one of the first virtual infrastructure providing unit, second virtual infrastructure providing unit, and third virtual infrastructure providing unit providing an upper layer virtual infrastructure, and
 wherein having performed processing in accordance with the control information, the first virtual infrastructure providing unit, which receives the output of the control information, distinguishes, among the plurality of virtual objects, to which the a first virtual object the respective control information has been given, and having performed processing in accordance with the control information, outputs additional control information to the first virtual object that is being used.

21. The control server according to claim 1, wherein having performed processing in accordance with the control information, the second virtual infrastructure providing unit, which receives the output of the control information, distinguishes, among the plurality of virtual objects, to which the a second virtual object the respective control information has been given, and having performed processing in accordance with the control information, outputs additional control information to the second virtual object that is being used, wherein the first virtual device providing unit comprises an interface or logic that provides the plurality of virtual objects for controlling associated physical resources configured as a virtual machine, and wherein the first, second and third virtual infrastructure providing units abstract resources of a computer network.

22. The control server according to claim 1, further comprising a computer including the first virtual device providing unit, the first virtual infrastructure providing unit, the second virtual infrastructure providing unit, the third virtual infrastructure providing unit, a virtual infrastructure configuration storage unit, and a virtual object configuration storage unit provided on a non-transitory computer readable medium and executable by a processor.

23. The control server according to claim 22, wherein the virtual infrastructure configuration storage unit and the virtual object configuration storage unit store information that describes a correspondence between the first, second and third virtual infrastructure providing units in one layer and those in another layer, to control information that is transmitted between hierarchical virtual infrastructures including the first, second and third virtual infrastructure providing units.

24. The control server according to claim 1, wherein the third virtual infrastructure providing unit, at a relatively lower layer than the second virtual infrastructure providing unit, is provided with a virtual object provided by the second virtual infrastructure providing unit at a relatively higher layer than the third virtual infrastructure providing unit.

25. The control server according to claim 1, comprising:
a virtual infrastructure configuration storage unit that stores a virtual object assigned to each of the virtual infrastructures; and
a virtual object configuration storage unit that stores information of the first, second and third virtual infrastructure providing units or the first and second virtual device providing units and that is a source of each of the virtual objects; wherein
reference is made to information stored in the virtual infrastructure configuration storage unit and the virtual object configuration storage unit, to cause to transmit control information to one of the virtual infrastructures and a virtual object forming the one of the virtual infrastructures.

26. The service providing system according to claim 6, wherein the control server further comprises:
a virtual infrastructure configuration storage unit that stores a virtual object assigned to each of the virtual infrastructures; and
a virtual object configuration storage unit that stores information of the first, second and third virtual infrastructure providing units or the first and second virtual device providing units and that is a source of each of the virtual objects; wherein
reference is made to information stored in the virtual infrastructure configuration storage unit and the virtual object configuration storage unit, to cause to transmit control information to one of the virtual infrastructures and a virtual object forming the one of the virtual infrastructures.

27. The method of providing a virtual infrastructure according to claim 8, wherein the control server further comprises:
a virtual infrastructure configuration storage unit that stores a virtual object assigned to each of the virtual infrastructures; and
a virtual object configuration storage unit that stores information of the first, second and third virtual infrastructure providing units or the first and second virtual device providing units and that is a source of each of the virtual objects; wherein
the control server makes reference to information stored in the virtual infrastructure configuration storage unit and the virtual object configuration storage unit, to cause to transmit control information to one of the virtual infrastructures and a virtual object forming the one of the virtual infrastructures.

* * * * *

UNITED STATES PATENT AND TRADEMARK OFFICE
CERTIFICATE OF CORRECTION

PATENT NO. : 10,210,008 B2  
APPLICATION NO. : 13/388039  
DATED : February 19, 2019  
INVENTOR(S) : Hideyuki Shimonishi et al.

Page 1 of 1

It is certified that error appears in the above-identified patent and that said Letters Patent is hereby corrected as shown below:

In the Specification

Column 1, Background, Line 40; Delete "visualization" and insert --virtualization-- therefor Column 8, Preferred Modes, Line 33; Delete "devices." and insert --devices,-- therefor In the Claims Column 14, Line 64; In Claim 2, after "provide,", insert --as--

Signed and Sealed this  
Thirtieth Day of July, 2019

Andrei Iancu  
*Director of the United States Patent and Trademark Office*